United States Patent
Guigui et al.

(10) Patent No.: US 11,916,751 B2
(45) Date of Patent: Feb. 27, 2024

(54) PROCESS DATA CHANGE NOTIFICATION FROM A UNIFIED DATA REPOSITORY

(71) Applicant: Hewlett Packard Enterprise Development LP, Spring, TX (US)

(72) Inventors: Alain Guigui, Isere (FR); Sebastien Klahr, Isere (FR); Ravi Saxena, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/045,574

(22) Filed: Oct. 11, 2022

(65) Prior Publication Data

US 2024/0022482 A1    Jan. 18, 2024

(30) Foreign Application Priority Data

Jul. 13, 2022  (EP) .................................. 22306059

(51) Int. Cl.
*H04L 41/14* (2022.01)
*H04L 41/0823* (2022.01)
*H04L 43/0876* (2022.01)

(52) U.S. Cl.
CPC ........ *H04L 41/145* (2013.01); *H04L 41/0823* (2013.01); *H04L 43/0876* (2013.01)

(58) Field of Classification Search
CPC ............... H04L 41/145; H04L 41/0823; H04L 43/0876; H04W 8/10; H04W 4/021; H04W 64/003; H04W 68/005; H04W 60/00
See application file for complete search history.

(56) References Cited

U.S. PATENT DOCUMENTS

| | | |
|---|---|---|
| 5,910,987 A | 6/1999 | Ginter et al. |
| 7,120,800 B2 | 10/2006 | Ginter et al. |
| 7,752,466 B2 | 7/2010 | Ginter et al. |
| 7,831,823 B2 | 11/2010 | Ginter et al. |
| 8,489,760 B2 | 7/2013 | Visharam et al. |
| 10,346,443 B2 | 7/2019 | Gupte et al. |
| 10,868,893 B2 | 12/2020 | Pope et al. |
| 10,999,303 B2 | 5/2021 | Pope et al. |
| 2020/0195495 A1 | 6/2020 | Parker et al. |

(Continued)

OTHER PUBLICATIONS

3GPP TS 22.261, "3rd Generation Partnership Project; Technical Specification Group Services and System Aspects; Service requirements for the 5G system; Stage 1 (Release 17)", V17.2.0, 2020, 83 pages.

(Continued)

*Primary Examiner* — Shirley X Zhang
(74) *Attorney, Agent, or Firm* — Hewlett Packard Enterprise Patent Department

(57) ABSTRACT

Examples for analyzing the usage of virtualized network instances within a communication network, are described. In an example, a usage monitoring service may receive a data change notification from a unified data repository. The data change notification is generated by the unified data repository in response to a data modification in subscriber data of a virtualized network instance. In an example, the data modification retrieved from the generated data change notification is utilized to obtain usage indication information for the virtualized network instance.

19 Claims, 6 Drawing Sheets

(56) References Cited

U.S. PATENT DOCUMENTS

2020/0220791 A1 7/2020 Aiello et al.
2022/0150811 A1* 5/2022 Kim .................... H04W 76/30

OTHER PUBLICATIONS

3GPP TS 29.501, "3rd Generation Partnership Project; Technical Specification Group Core Network and Terminals; 5G System; Principles and Guidelines for Services Definition; Stage 3 (Release 17)", V17.2.0, 2021, 78 pages.
3GPP TS 29.504, "3rd Generation Partnership Project; Technical Specification Group Core Network and Terminals; 5G System; Unified Data Repository Services; Stage 3 (Release 17)", V17.1.0, 2020, 39 pages.
3GPP TS 29.505, "3rd Generation Partnership Project; Technical Specification Group Core Network and Terminals; 5G System; Usage of the Unified Data Repository services for Subscription Data; Stage 3 (Release 15)", V15.4.0, 2019, 114 pages.
NGMN Alliance, "Perspectives on Vertical Industries and Implications for 5G", Sep. 19, 2016, 41 pages.

* cited by examiner

PROCESS DATA CHANGE NOTIFICATION FROM A UNIFIED DATA REPOSITORY

BACKGROUND

Modern mobile communications system may cater to a varied range of service considerations for different application scenarios or Service Level Agreements (SLAs). Example of different application scenarios include high-definition video (such as ultra-high definition or 8K video), massive machine device communication, and mobile device communication with high or ultra-reliability and ultra-low latency (for vehicle-to-vehicle communication or for remote surgery). For enabling such varied service considerations (which may stem from different applications), a network may be divided into a plurality of network slices within the Fifth Generation (5G) communication networks.

BRIEF DESCRIPTION OF FIGURES

Systems and/or methods, in accordance with examples of the present subject matter are now described, by way of example, and with reference to the accompanying figures, in which.

DETAILED DESCRIPTION

Figure 1:
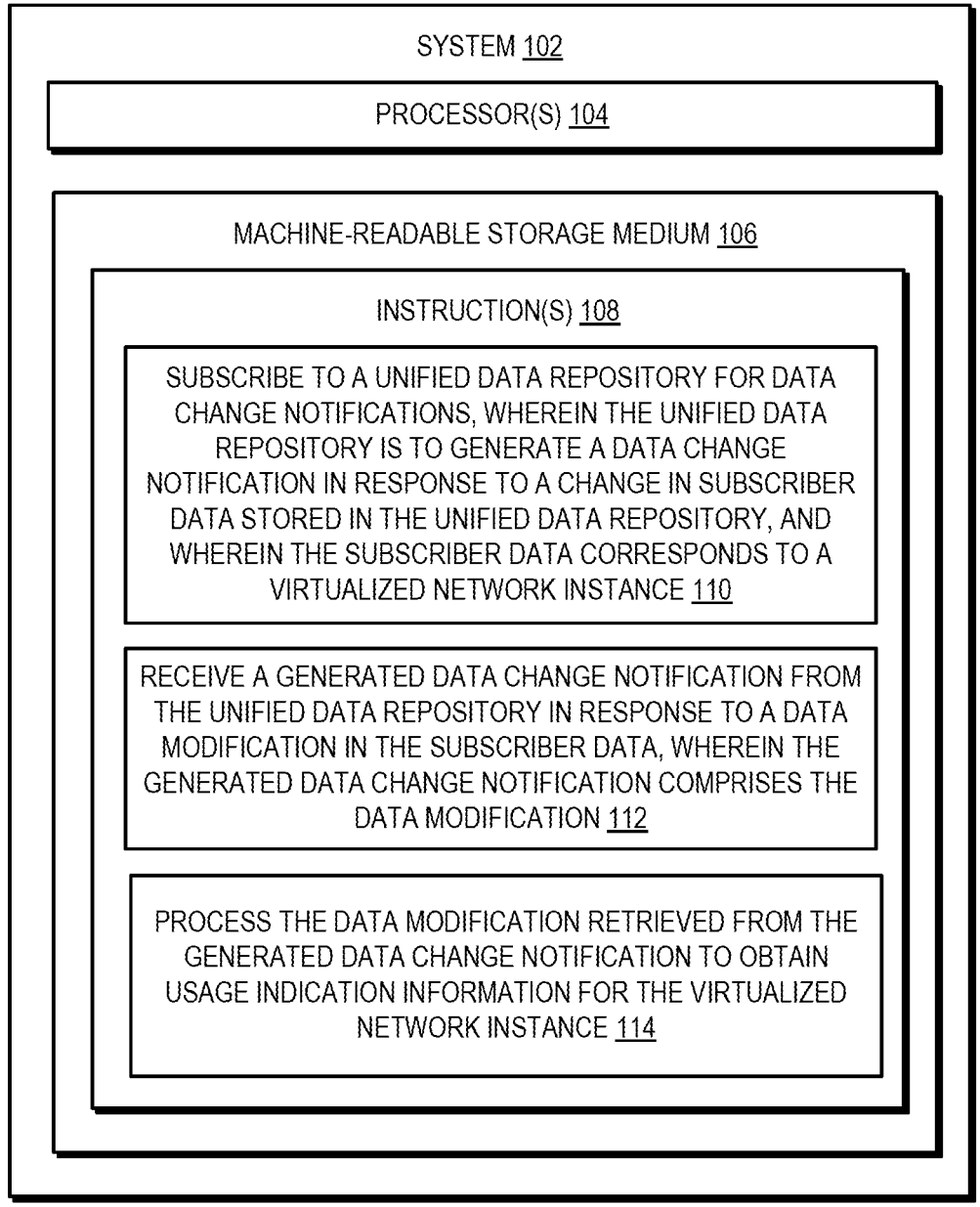
FIG. 1 illustrates a system for analyzing usage of virtualized network instances within a communication network, as per an example.

Modern mobile communications system may service different application scenarios with different Service Level Agreements (SLAs) through network slices. Network slices may be considered as independent and isolated virtualized network instances which may be deployed on a physical network infrastructure. Each network slice may be allocated to a consumer based on service considerations, customer demand and applications, segmentations, and combination of such (or other) factors. A consumer may be considered as an entity (such as an enterprise) that may be consuming or utilizing the network slices. Such consumers may be providing services to other customers. In this case, operators may allocate resources to different network slices for specific speeds, throughput, or latency. In certain other cases, the operators may also apply different policies or rules to different network slices for enabling the consumer service considerations. Network slices may be offered to enterprises requesting a specific connectivity where data volume or time-based charging functions are not used.

Network slicing enables an operator of a network to create virtual networks which may be customized to provide configurable solutions for different network scenarios, and as per diverse demand requirements, e.g. in the areas of functionality, performance, and isolation. Wireless communications networks, such as fifth-generation or "5G" networks support different network slices. In order to support several 5G applications, multiple User Equipments ("UEs") may connect to multiple network slices. A UE may be any communication device used by an end user that may connect to a communication network, such as the 5G network. Such UEs may be registered with either a single network slice or multiple network slices.

Within the 5G network architecture, a standardized repository referred to as the Unified Data Repository (UDR) stores data grouped into different sets of information that may be accessed by various network services. These network services, referred to as network functions, have defined functionalities such as authentication, policy control, and session management. The different types of information stored within the UDR may correspond to such functionalities and may include subscription data, authentication data, application data, and policy data. Such information may be used for effecting network operations and the services which may be implemented through the network slices.

Different network slices may be offered for different types of services involving different use-case scenarios. For example, an operator may offer a first slice that may be configured for high bandwidth applications (e.g., video streaming), while a second slice may be offered for low latency applications (e.g., multiplayer online gaming, industrial automation, and such). Another network slice may be provided for servicing a plurality of IoT devices. Depending on the nature of services being enabled, appropriate resources may be provided for the corresponding network slices. Any changes in use-case scenarios (e.g., number of subscribers or type of applications being hosted by the network slices), may have to assessed through network planning for continuing the performant operation of the communication network and for improving the services being offered. Such network planning may involve managing resources which may be allocated to the network slices.

Network planning may be based on analyzing usage of network slices within the communication network. Information pertaining to the usage of the network slices may include information involving the subscribers, the network slices, applications, and services being implemented through the network slices. In addition, certain service-related functions, such as billing for usage of the network slices, metering for usage of network slices, or combination thereof, which may involve obtaining and processing subscriber related information. Although such information is available within the UDR, the UDR may be adapted and configured to operate in frequent access and low latency workloads within the communication network. Querying the UDR may impact the performance of the UDR, which in turn may impact the efficiency of the communication network operations.

Furthermore, to minimize any overhead, the UDR may refresh or purge subscriber information after a predefined period of time. In such instances, subscriber information predating the predefined period of time may be lost and may not be obtained from a simple query of the UDR. Therefore, utilizing such information for network planning or for further improving services would not be possible, and may pose challenges when devising optimized solutions as part of network planning.

Approaches for analyzing subscriber data of virtualized network instances within a communication network, are described. An example of a virtualized network instance may include, but may not be limited to, a network slice. In the context of 5G communication networks, the subscriber data may be stored in the Unified Data Repository (UDR) and may refer to different categories of data pertaining to subscribers, the network slices to which such subscribers may be registered with, services or application implemented on the network slices, or a combination thereof. Examples of categories of subscriber data include, but are not limited to, subscription data, authentication data, application data, and policy data, pertaining to the network slice with which the UDR may be associated with. As will be further explained, portions of subscriber data are obtained without substantially affecting the performance of the UDR.

The subscriber data, once obtained, may be processed and analyzed to provide usage indication information of the network slice. The usage indication information may be used for optimizing operations of the network slices through network planning or for performing service-related functions. For example, network planning may entail scaling of computational resources which may be allocated to the network slices, based on usage indication information. On the other hand, service-related functions may include functions such as billing, metering usage, or combination thereof.

In operation, a usage monitoring service may be deployed within a communication environment. The usage monitoring service may be remote to the UDR and may communicate with the UDR through predefined or standardized interfaces. In an example, the usage monitoring service may subscribe for data change notifications from the UDR. A data change notification is a notification that is generated by the UDR when the subscriber data being stored therein, changes. The subscriber data within the UDR may undergo a change when a subscriber interacts with the network slice. The change or the data modification in the UDR results in the generation of a data change notification. For example, the subscription data stored within the UDR may change when a new subscriber subscribes to or registers with a network slice. In this case, the data modification in the form of subscription data of the new subscriber results in the generation of the data change notification by the UDR.

In an example, the generated data change notification may include data modification caused to the subscriber data. For example, the data change notification may include the registration data pertaining to the registered customer. In a similar manner, the usage monitoring service may be intimated of changes to the other data of the subscriber, such as information pertaining to the usage of a certain service, time of access, location of access, type of access, etc.

The usage monitoring service on receiving the data change notification may process the same to obtain the data modification included therein. The data modification thus obtained may be stored in a service repository coupled to the usage monitoring service, as network slice data. The above described steps may be continually performed over a period of time, to obtain various sets of data modifications. Over a period of time, the collection of various data modifications or the network slice data would be similar to the subscriber data available within the UDR. Since no querying of the UDR is involved, the network slice data thus obtained is without substantially affecting the performance of the UDR.

Different types of information may be retrieved and analyzed for assessing usage of the network slices. For example, subscriber related data may be retrieved from the service repository to determine active number of subscribers for a given network slice, frequency of access, duration of access, time instants of access, or location of access. Based on retrieved subscriber related data, the usage by any given subscriber may be analyzed. It may be noted that such analysis is not restricted to subscriber related data. Different types of data pertaining to the network slices may also be retrieved and analyzed to obtain usage indication information. The usage indication information may be used to assess usage of the network slices by a given subscriber.

For example, location information of network slices may be retrieved and analyzed to assess which types of services are being accessed within a geographical region. Another example may include retrieving information pertaining to the type of access being relied for accessing certain services. Types of access may include 3GPP access technologies (e.g., through 5G or LTE) or non-3GPP access technologies (e.g., WiFi, WiMAX, or fixed networks). Although described with respect to the above examples, different combinations of information may be retrieved and analyzed to provide usage indication information for specific network slices. The usage indication information may thereafter be used for network planning. The usage indication information may be used for managing operational attributes, such as allocated computational resources or policies, of the network slices. For example, the operational attributes may be managed, depending on the change in the number of active subscribers, latency, or bandwidth requirements for certain specific services, or based on other aspects that may pertain to the operation of the network slices. In an example, the data from the service repository may be retrieved through queries. The query may be scheduled or may be triggered according to a given policy or event.

The data retrieved from the service repository may also be processed for service-related functions, such as billing or for metering usage. For example, an operator may bill for usage of the network slices based on the active number of subscribers for the given network slice, the duration of access, or the type of service being accessed. Accordingly, the usage of the network slices within the communication network may be monitored, metered and billed. Although the above-mentioned approaches and examples have been described in the context of 5G networks, the same is not to be considered as a limitation. These approaches may be adopted for other types of communication networks as well without deviating from the scope of the present subject matter. These and other examples are further described in conjunction with the accompanying figures.

FIG. 1 illustrates a system 102 for analyzing the usage of virtualized network instances within a communication network based on a data change notification, as per an example. The system 102 includes processor(s) 104. System 102 may also include a machine-readable storage medium 106 coupled to and accessible by the processor(s) 104. The machine-readable storage medium 106 stores instruction(s) 108, that is accessible by the processor(s) 104. In an example, the system 102 may be implemented as a stand-alone computing device within a 5G core network. The processor(s) 104 may be implemented as a dedicated processor, a shared processor, or a plurality of individual processors, some of which may be shared. In an example, the processor(s) 104 may be implemented locally within the system 102 or may be implemented remotely in another computing system. When implemented remotely, the instruction(s) 108 may be transmitted to such a computing system for execution.

The machine-readable storage medium 106 may be communicatively connected to the processor(s) 104. Among other capabilities, the processor(s) 104 may fetch and execute computer-readable instruction(s) 108, stored in the machine-readable storage medium 106. The processor(s) 104 may execute the instructions 108 to implement a usage monitoring service (not shown in FIG. 1). In an example, the processor(s) 104 may execute instructions 110. The instructions 110 when executed may cause the usage monitoring service to subscribe to a unified data repository (not shown in FIG. 1) for data change notifications. The unified data repository (referred to as the UDR) may store and maintain subscriber data pertaining to subscribers and network slices, with which the subscribers may be registered. A subscriber may be any communication device which may access a network slice for availing a service. The data change notification is generated in response to a change in subscriber data in UDR.

Thereafter, the instructions 112 may be executed so as to cause the usage monitoring service to receive a generated data change notification. The data change notification is received from the UDR in response to a data modification in the subscriber data. The data change notification is such that it includes the data modification in the subscriber data. For example, a subscriber may register with a given network slice for availing a certain service. On registering, information of the subscriber will be added as the data modification to the subscriber data, thus modifying it. Since the subscriber data has changed, a data change notification is generated. In an example, the data change notification includes the data modification. Thereafter, the instructions 114 may be executed to process the data modification retrieved from the generated data change notification. In an example, the data modification may be stored in a service repository as network slice data and processed to obtain usage indication information for the network slice under consideration. The usage indication information may be used for analyzing the usage of the network slices.

Figure 2:
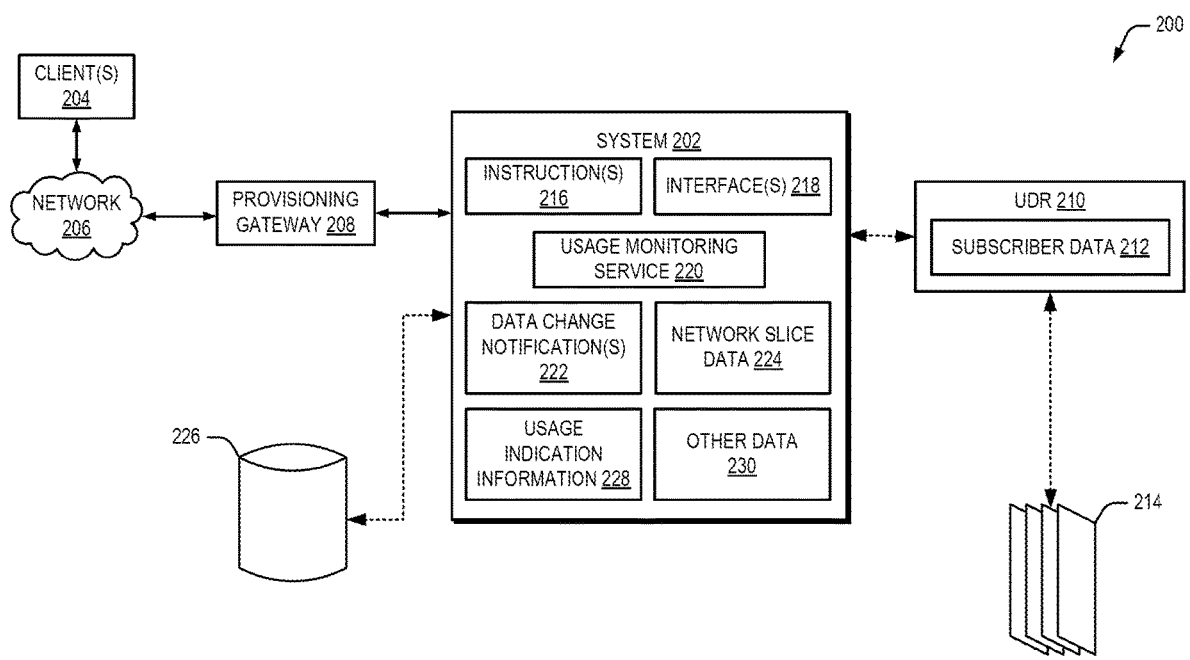
FIG. 2 illustrates a computing environment including a system for analyzing usage of virtualized network instances within a communication network, as per an example.

FIG. 2 illustrates a communication environment 200. The communication environment 200 (hereinafter referred to as the environment 200) may include one or more functional network entities or blocks within a core communication network. In an example, the environment 200 may include a system 202. The system 202 may be implemented as a server device or a standalone computing system and may be a network entity within the 5G core network. In an example, the access to the core network may be implemented through a telecommunication-based access or may be based on any other type of access (e.g., through a WiFi network).

The system 202 may be in communication with a plurality of client(s) 204 through a network 206 and provisioning gateway 208. The provisioning gateway 208 may be any network entity which is to direct requests or queries from the client(s) 204 to other network entities within the environment 200. The network 206 may be a private network or a public network and may be implemented as a wired network, a wireless network, or a combination of a wired and wireless network. The network 206 may also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

The system 202 may receive and process service requests or queries from the client(s) 204. The client(s) 204 may be any software enabled client that may be a consumer of the virtualized network resources. In an example, the system 202 is further coupled to the UDR 210 which is to store the subscriber data 212. The subscriber data 212 stored within the UDR 210 pertains to the network slice(s) 214 and the subscribers which may be registered with the network slice(s) 214. As described above, the network slice(s) 214 may be considered as independent and isolated virtualized network instances which may be deployed on a physical network infrastructure.

The subscriber data 212 may include data grouped into different sets of information. The subscriber data 212 may be accessed by various network services, referred to as network functions (not shown in FIG. 2). In the context of 5G core network, examples of such network entities (also referred to as network functions) include, but are not limited to, Access and Mobility Management Function (AMF), Network Exposure Function (NEF), Policy Control Function (PCF), Session Management Function (SMF), and Unified Data Management (UDM). These and other network entities are further defined in the 3GPP TS 23.501 standard defining the system architecture for 5G systems. These network functions are to perform defined functionalities with respect to subscribers registered with the network slice(s) 214. Examples of such functionalities include, but are not limited to, data management, authentication, policy control, secure exposure of network services, and session management. The subscriber data 212 is to store data under different categories corresponding to such functionalities. For example, the subscriber data 212 may include different categories of information such as subscription data, authentication data, application data, and policy data. The subscriber data 212 and the UDR 210, in an example, may be implemented as described under one or more 3GPP standards, such as the 3GPP 29.503, 3GPP 29.504, 3GPP 29.505, 3GPP 23.501, 3GPP 23.502, and other relevant standards.

The system 202 may further include instruction(s) 216 and an interface 218. The instruction(s) 216 may be similar to the instruction(s) 108 (as described in FIG. 1). The interface 218 may include software implemented interfaces as well as hardware implemented interfaces that may enable the system 202 to communicatively couple with other entities within the environment 200. For example, the interface 218 may further enable the system 202 to communicate with the client(s) 204 through the network 206. In another example, the interface 218 may enable the system 202 to communicate with other network entities within the environment 200.

The system 202 may further include a usage monitoring service 220. The usage monitoring service 220 may be implemented as a combination of hardware and programming, for example, programmable instructions to implement a variety of functionalities. In examples described herein, combinations of hardware and programming may be implemented in several different ways. For example, the programming for the usage monitoring service 220 may be executable instructions. In another example, the usage monitoring service 220 may include a processing resource, for example, either a single processor or a combination of multiple processors, to execute the instructions. In the present examples, the non-transitory machine-readable storage medium may store instructions, such as instruction(s) 216, that when executed by the processing resource, implement the usage monitoring service 220. In other examples, the usage monitoring service 220 may be implemented as electronic circuitry. It may be understood the system 202 may include other network functions pertaining to the operation of a communication network. Such functional entities may be adapted by way of instruction(s) 216 to operate as the usage monitoring service 220. In another example, the usage monitoring service 220 may be implemented in addition to such network functions. Such implementations are different examples of the claimed subject matter. The system 202 may further include other services or engines (not shown in FIG. 2) that may perform other functions of the system 202.

In operation, the usage monitoring service 220 may subscribe to the UDR 210 for data change notifications. The data change notifications may be generated by the UDR 210 in the event of any changes to the subscriber data 212. As discussed earlier, the subscriber data 212 stores different categories of data such as subscription data, authentication data, application data, and policy data. A change or data modification to any of such data categories may result in the UDR 210 generating the data change notification. For example, the subscription data may include registration information of subscribers who may have subscribed to, registered with, or are otherwise associated with network slice(s) 214. Such information may include identifiers of the subscribers, identifiers of the network slice(s) 214 with which the subscribers may be registered with, services being utilized by the subscriber, and time of registration. A subscriber when registered may be understood as being serviced by any one of the network slice(s) 214 under consideration.

The subscriber data 212 may change as subscribers interact and seek access to the network slice(s) 214. The interaction between the additional subscribers may result in a change to the subscriber data 212. This aspect is explained with respect to subscription data which is included within the subscriber data 212. As may be noted, a registration with the network slice(s) 214 may add the registration information of such a subscriber to the subscription data within the subscriber data 212. Owing to this data modification, i.e., the registration data of the subscriber, the subscriber data 212 changes which in turn results in the generation of the data change notification.

Data changes in the subscriber data 212 may also take place when an existing subscriber interacts with the network slice(s) 214. For example, the subscriber may seek access to a certain service at different time instants. In such a case, the subscriber information within the subscriber data 212 may log the time instant when the subscriber seeks access to the given service. The subsequent time instants when the subscriber seeks to access the given service forms the data modification to the subscriber data 212 within the UDR 210. In this manner, any interaction between one or more subscriber with the network slice(s) 214 may be communicated to the usage monitoring service 220 through the data change notifications generated by the UDR 210. Since the usage monitoring service 220 has subscribed to the data change notifications, the data change notification generated by the UDR 210 is communicated to the usage monitoring service 220.

Generation of data change notifications are feature of the UDR 210 as defined under technical standards, such as the 3GPP 29.504. Although explained with respect to subscription data, changes to any other categories of data may be determined and accordingly communicated through the data change notifications in a similar manner. In such cases, the usage monitoring service 220 may subscribe to data changes to such categories and determine the data modification effected to any of these data categories in the subscriber data 212.

To generate the data change notification, the UDR 210 may determine the data modification that may have been caused to the subscriber data 212. The data modification once identified may thereafter be included within the data change notification. The data change notification is generated and may be transmitted to the usage monitoring service 220. The usage monitoring service 220 may receive and store the same as data change notification(s) 222 within the system 202.

Thereafter, the data change notification(s) 222 may be processed by the usage monitoring service 220 to obtain network slice data 224. In an example, the usage monitoring service 220 may parse the data change notification(s) 222 to obtain data modification. The data modification once obtained is stored as network slice data 224. Similar to the subscriber data 212, the network slice data 224 may include different categories of information pertaining to the subscriber registered with the network slice(s) 214. Examples of these different categories include, but are not limited to, subscriber identifiers, identifiers of the network slice(s) 214, types of services to which the subscriber may be registered to, types of access, location information of the subscriber, time of registration, time of access, and such other information pertaining to the subscribers and the network slice(s) 214 to which the subscribers may be registered with. The network slice data 224 thus obtained may be stored within the system 202 or may be stored in a service repository 226 which may be coupled to the usage monitoring service 220. The service repository 226 may be implemented by way of a single computer readable medium or a combination of multiple computer readable media.

In the manner as described above, the usage monitoring service 220 may continually obtain the data change notification(s) 222 from the UDR 210 and determine the network slice data 224, as and when subscribers interact with the network slice(s) 214. The network slice data 224 may then be used for deriving usage indication information 228, which may depict information of subscribers or other information pertaining to the network slice(s) 214, with which the subscribers may have registered.

The network slice data 224 (stored either within the system 202 or within the service repository 226) may be further analyzed to assess the usage of the network slice(s) 214 within the environment 200. The analysis may be for any one of the network slice(s) 214, or for a plurality of network slice(s) 214. In an example, the analysis of the network slice data 224 may be performed through automated mechanisms, such as programmed code, or through other computer-implemented approaches, such as statistical modelling, regression analysis, etc., or approaches based on artificial intelligence. Any of these approaches may be adopted without limiting the scope of the claimed subject.

As an example, the analysis of the network slice data 224 may be performed using predefined rules. Based on the predefined rules, the usage monitoring service 220 may process the data to provide the usage indication information 228. For example, to determine active number of subscribers, the usage monitoring service 220 may analyze the network slice data 224 comprising number of subscribers which may have registered with a particular network slice(s) 214. Furthermore, time of registration within the network slice data 224 may be analyzed to determine a number of registrations that may have occurred during a given time interval. In a similar manner, other information included within the network slice data 224, such as name or type of services for which access was sought, location of subscribers requesting access to service, or type of access (i.e., 3GPP or non-3GPP technology-based access) used for accessing the network slice data 224, may be analyzed to assess the usage of the network slice(s) 214. The listed examples are only indicative—the analysis of the network slice data 224 may be based on other parameters which may be considered alone, or in combination with either each other, or any other example as described above.

In another example, the analysis may be performed through predefined executable queries. The queries may be defined based on any one or more parameters, as explained above. Once defined, the queries may be executed on the network slice data 224 by the usage monitoring service 220. Once executed on the network slice data 224, the queries may return the results to the usage monitoring service 220 which may store the results as usage indication information 228. The query may be scheduled to be executed as a specified instant or may be initiated based on commands from an administrator. In an example, the predefined rules, and the queries may be stored in other data 230. In such a case, the usage monitoring service 220 may retrieve any one of the predefined rules, or the queries from the other data 230 for analyzing the network slice data 224 and to obtain usage indication information 228.

The usage indication information 228 obtained as a result of the analysis of the network slice data 224 may provide an indication of the usage of network slice(s) 214 within a communication network. The usage of the network slice(s) 214 may be depicted from a variety of perspectives. For example, the usage indication information 228 may depict the number of subscribers which may be registered with the network slice(s) 214. In such a case, the usage indication information 228 may directly represent the active customers which may be registered with the network slice(s) 214. In another example, the usage indication information 228 may depict a distribution of active subscribers across different time intervals for any one of the network slice(s) 214, time of access, location of access, types of services being accessed, etc.

The usage indication information 228 may be used for managing operational attributes of the communication network for its performant operation. Operational attributes may refer to computational resources or similar infrastructure components that be deployed for the network slice(s) 214. In an example, the usage indication information 228 depicting an active number of subscribers registered with the network slice(s) 214 may be used for managing the computational resources that may be allocated to the network slice(s) 214. If the number of subscribers is high (or greater than a certain threshold), a decision may be taken for further allocation of computational resources (e.g., processors, memory, etc.) for any one or more of the network slice(s) 214.

Operational attributes may also include policies that may have been implemented on the network slice(s) 214 within the communication network. These approaches may be adopted for different types of usage scenarios as depicted by the usage indication information 228. For example, the usage indication information 228 may indicate that a set of network slices from amongst the network slice(s) 214 are utilized for IoT services (or any other service relying on low latency) but not for voice communication. In such a case, certain policies may be implemented which allow the network slice(s) 214 under consideration to be used for low latency services and not for communication services.

Managing the operational attributes of the network slice(s) 214 based on the usage indication information 228 may be performed either manually by an administrator, or by way of automated instructions. For example, provisioning of computational resources may be physically managed by installing or deploying additional hardware for use by the network slice(s) 214. In another example, provisioning of such computational resources may be performed through executable instructions or policies which may manage (i.e., either scale up or scale down) allocation of installed computational resources. If the managing of the operational attributes is performed through instructions, the usage monitoring service 220 may process the usage indication information 228 and accordingly execute predefined instructions for managing the operational attributes of the network slice(s) 214.

The usage indication information 228 may be used for performing certain service related functions, such as metering usage or billing. In such a case, the usage monitoring service 220 may determine the active number of subscribers who may have registered with the network slice(s) 214. In another example, the active subscriber information 218 may be utilized for determining historical information for particular subscribers or for the network slice(s) 214. In this manner, any other basis for performing service-related functions (e.g., time for which the subscriber may have utilized a given service) may be determined. As may be understood, certain network slices may be prescribed for certain dedicated services. For instance, a first set of network slices may be dedicated for low latency applications while another second set of network slices may be dedicated for high bandwidth application. The first set and the second set may be associated with different billing rates (e.g., the first set be associated with a higher billing rates as compared to the second set). In this example, time for which the subscriber may have been registered with the first set of network slices and the second set of network slices may be determined separately, and accordingly usage of the first set and the second set of network slices may be billed accurately. Any other combination of information which is included in the usage indication information 228 may be used for performing other service-related functions, without deviating from the scope of the current subject matter.

Figure 3:
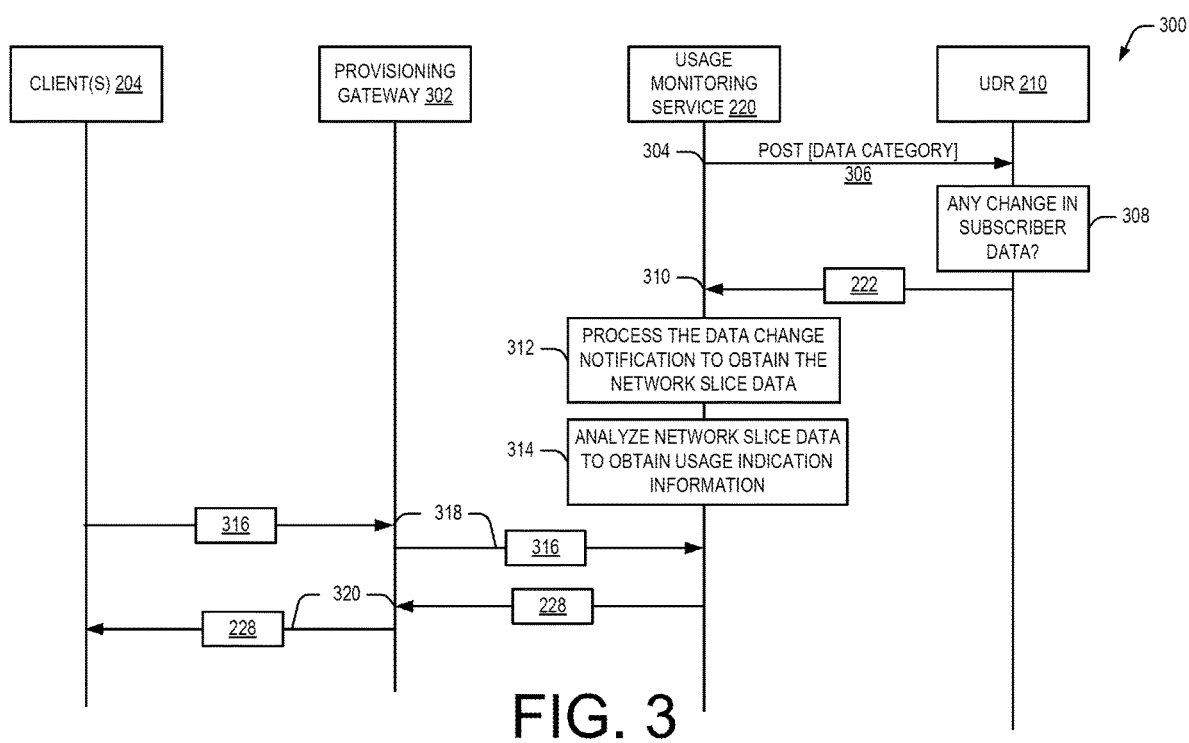
FIG. 3 is a sequence diagram depicting various examples as per which usage of virtualized network instances within a communication network may be analyzed.

FIG. 3 is an example sequence diagram depicting a series of steps for analyzing the usage of virtualized network instances (i.e., the network slices) within a communication network. The steps are described with respect to interactions between the client(s) 204, the usage monitoring service 220 and the UDR 210 within the environment 300. The environment 300 may further include a provisioning gateway 302 (which may be similar to the provisioning gateway 208). The provisioning gateway 302 may be a network entity which may direct requests or queries from the client(s) 204 to the entities within the environment 300.

The provisioning gateway 302, the client(s) 204, the usage monitoring service 220, and the UDR 210 may communicate with each other through various interfaces. For example, the client(s) 204 and the provisioning gateway 302 may interact with each other through a Representational State Transfer (REST) interface. In a similar manner, the provisioning gateway 302 and the usage monitoring service 220 may communicate each other through the REST interface, as well. The usage monitoring service 220, on the other hand, may communicate with the UDR 210 over the NUDR-service (i.e., the Nudr_DataRepository service) interface. The Nudr_DataRepository service interface may be implemented as described under various 3GPP standards, such as the 3GPP 29.503, 3GPP 29.504, 3GPP 29.505, 3GPP 23.501, and 3GPP 23.502. It may be noted that the current listing of the standards is indicative, and not all applicable standards have been listed for sake of brevity.

The usage monitoring service 220 may be initially deployed within the computing environment 200. In operation, the usage monitoring service 220 may subscribe to the UDR 210 for data change notifications. For example, the usage monitoring service 220 may send a POST request to subscribe to the UDR 210 to obtain the data change notifications (at step 304). The POST request (represented as request 306), in the present example, may specify the category of data within the subscriber data 212 for which the data change notifications are to be subscribed. For example, the POST request may specify subscription data for which data notifications are to be subscribed. In an example, the UDR 210 may respond with an acknowledgment indicating that the subscription to the data change notifications have been created. The POST requests are natively defined for the UDR 210 and are prescribed as standardized functions under one or more 3GPP standards, such as 3GPP 29.504.

With the usage monitoring service 220 subscribed to the UDR 210, the UDR 210 may determine whether any change has occurred to the subscriber data 212 (at step 308). As described previously, the data change notifications may be generated in the event of any changes to the subscriber data 212 in the UDR 210. For example, the subscription data stored within the UDR may change when a new subscriber subscribes to, or registers with, a network slice. In such a case, the subscription data in the UDR 210 would include details of such a registered subscriber. In response to this data modification to the subscriber data 212, the data change notification may be generated by the UDR 210. The generated data change notification may include the data modification caused to the subscriber data 212. For example, the data change notification may include the registration data pertaining to the registered customer. In a similar manner, the usage monitoring service 220 may be notified of any changes to the subscriber information, such as information usage of a certain service, time of access, location of access, type of access, etc.

The subscriber data 212 may undergo a change if one or more subscribers register to any of the network slice(s) 214. The data change notification(s) 222 generated is sent by the UDR 210 to the usage monitoring service 220 (at step 310). The data change notification(s) 222 once received, may be processed by the usage monitoring service 220 to obtain the data modification included in the data change notification(s) 222 (at step 312). In an example, the usage monitoring service 220 may parse the data change notification(s) 222 received from the UDR 210 to obtain the data modification (which resulted in the data change notification(s) 222 being generated). The data modification obtained from the data change notification(s) 222 may be stored as network slice data 224.

The above described series of steps may be continually performed to gather the data modifications that may have been effected to the subscriber data 212. Over a period of time, the collection of various data modifications would be similar to the subscriber data available within the UDR 210. Similar to the subscriber data 212, the network slice data 224 may include different categories of information pertaining to the subscriber registered with the network slice(s) 214. Examples of such categories include, but are not limited to, subscriber identifiers, identifier of the network slice(s) 214, type of services to which the subscriber may be registered to, type of access, location information of the subscriber, time of registration, time of access, and such other information pertaining to the subscribers and the network slice(s) 214 to which the subscribers may be registered with.

The network slice data 224 may be further analyzed to assess the usage of the network slice(s) 214 within the environment 200 (at step 314). In an example, the usage monitoring service 220 may process the data to provide the usage indication information 228. The usage indication information 228 provides an indication of usage of the network slice(s) 214 under consideration. For example, to determine active number of subscribers the network slice data 224 may be analyzed to determine number of subscribers which may have registered with any one or more of the network slice(s) 214. In a similar manner, the network slice data 224 may be analyzed to determine number of registrations that may have occurred during a given time interval, name, or type of services for which access was sought, location of subscribers requesting access to service, or type of access (i.e., 3GPP or non-3GPP technology-based access) used for accessing the network slice data 224.

In an example, the usage monitoring service 220 may receive a query from a consumer through one of the client(s) 204 to retrieve usage indication information 228. As also described previously in conjunction with FIG. 2, the subscriber data 212 may thereafter be used for managing operational attributes of the network slice(s) 214 (e.g., manage resource allocation for the network slice(s) 214) or may be used for performing certain service related functions (e.g., for metering usage or billing). The query (depicted as query 316), may be received by the usage monitoring service 220 through the provisioning gateway 302 (at step 318). In an example, the query 316 may be received over the REST interface. The query 316 may thereafter be executed to retrieve the usage indication information 228. The usage indication information 228 may thereafter be provided by the usage monitoring service 220 to provisioning gateway 302, which in turn may provide the usage indication information 228 to the client(s) 204 (at step 320). The usage indication information 228 may be used by the consumer for determining whether any computational resources allocated to the network slice(s) 214 have to be scaled-up, scaled-down, or whether additional resources are to be installed for achieving performant operation of the communication network or for service improvements. In another example, the usage indication information 228 (which includes number of active subscribers) thus retrieved may be used by the client(s) 204 for metering usage or for billing.

In certain cases, the client(s) 204 may query the provisioning gateway 302 at a frequency which may be different from the frequency at which the provisioning gateway 302 is to query the network slice data 224. For example, the provisioning gateway 302 may query the network slice data 224 more frequently as compared to the client(s) 204 querying the provisioning gateway 302. In this manner, the provisioning gateway 302 may collate the active subscriber information 218 for certain specific time intervals before the same may be queried by the client(s) 204. Although FIG. 3 depicts client(s) 204 as a single entity, the provisioning gateway 302 may be queried by multiple other consumer clients who may query the provisioning gateway 302 to obtain the usage indication information 228.

Figure 4:
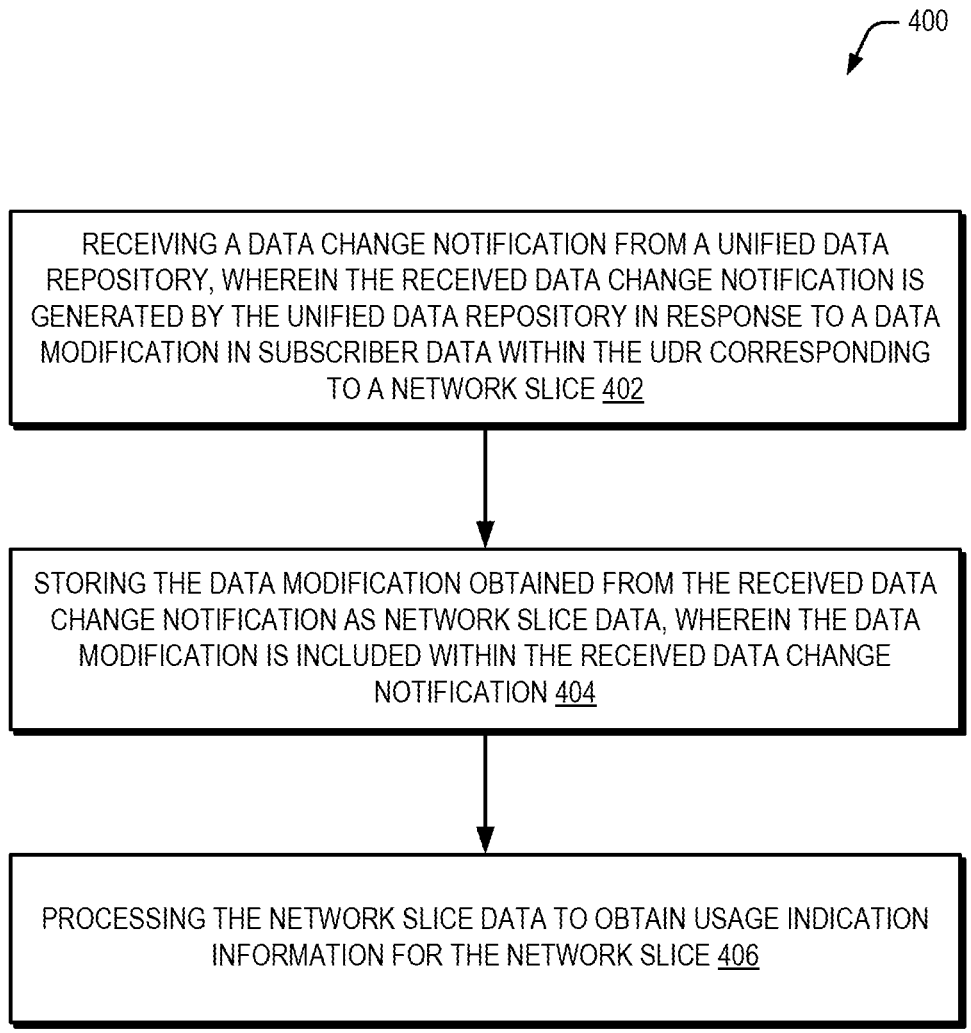
FIG. 4 illustrates a method for analyzing usage of virtualized network instances within a communication network, as per an example.

FIG. 4 illustrates a method 400 for analyzing the usage of virtualized network instances within a communication network based on a data change notification generated by a unified data repository, as per an example. The order in which the methods are described is not intended to be construed as a limitation, and some of the described method blocks may be combined in a different order to implement the methods, or alternative methods. Furthermore, the methods may be implemented in any suitable hardware, computer-readable instructions, or combination thereof. The steps of these methods may be performed by either a system under the instruction of machine executable instructions stored on a non-transitory computer readable medium or by dedicated hardware circuits, microcontrollers, or logic circuits. For example, the method 400 may be performed by the system 202 within the environment 200. Herein, some examples are also intended to cover non-transitory computer readable medium, for example, digital data storage media, which are computer readable and encode computer-executable instructions, where said instructions perform some or all of the steps of the above-mentioned method.

At block 402, a data change notification may be received from a unified data repository. The data change notification is generated by the unified data repository (or the UDR) in response to a data modification to the subscriber data stored therein. For example, the usage monitoring service 220 deployed within the environment 200 may receive a data change notification from the UDR 210 in response to changes to the subscriber data 212 corresponding to the network slice(s) 214. The change in the subscriber data 212 may occur whenever a subscriber interacts with the network slice(s) 214. For example, the change in the subscriber data 212 may occur in case any subscriber registers with any one of the network slice(s) 214. The data change notification may include the data modification that may have resulted in the change in the subscriber data 212. In the context of registration by a subscriber, the data modification may include registration data of the At block 404, data modifications may be extracted from the received data change notification and stored as network slice data. For example, the usage monitoring service 220 may parse the data change notification(s) 222 to obtain the data modification, which may have resulted in the generation of the data change notification(s) 222. The data modification once determined may be stored as network slice data 224. The network slice data 224, amongst other things, may include different categories of information pertaining to the subscriber registered with the network slice(s) 214, examples of which include, but are not limited to, subscriber identifiers, identifier of the network slice(s) 214, type of services to which the subscriber may be registered to, type of access, location information of the subscriber, time of registration, time of access, and such other information pertaining to the subscribers and the network slice(s) 214 to which the subscribers may be registered with. The network slice data 224 may be continually obtained by receiving and process the data change notification(s) 222. In an example, the network slice data 224 may be stored in the service repository 226.

At block 406, the network slice data in the service repository may be processed to obtain usage indication information for the network slice. For example, the usage monitoring service 220 may analyze the network slice data 224 to provide the usage indication information 228. The usage indication information 228, amongst other aspects may indicate the usage of the network slice(s) 214 within the environment 200. For example, to determine active number of subscribers the network slice data 224 may be analyzed to determine number of subscribers which may have registered with particular network slice(s) 214. In a similar manner, other information included within the network slice data 224, such as name or type of services for which access was sought, location of subscribers requesting access to service, or type of access (i.e., 3GPP or non-3GPP technology-based access) used for accessing the network slice data 224 may also be analyzed to assess the usage of the network slice(s) 214. The analysis of the network slice data 224 may be based on predefined rules or queries depending on the type of analysis required. In an example, the usage indication information 228 may be used for managing operational attributes of the communication network for its performant operation or may be used for performing certain service related functions, such as metering usage or billing.

Figure 5:
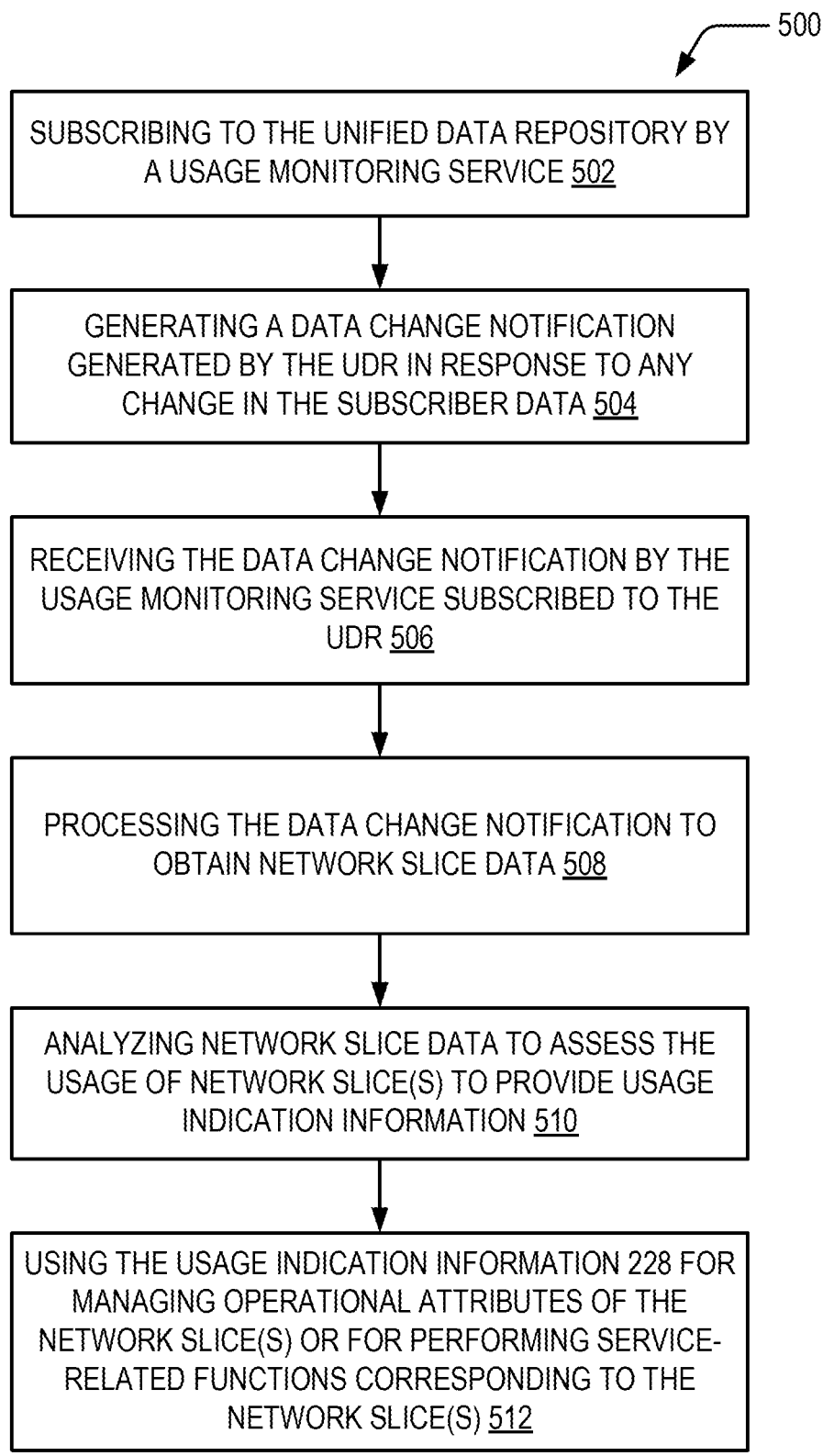
FIG. 5 illustrates a method for analyzing usage of virtualized network instances within a communication network, as per another example.

FIG. 5 illustrates a method 500 for analyzing the usage of virtualized network instances within a communication network, as per another example. Similar to the method 400, the method 500 may also be implemented through the system 202 within the environment 200 or within the environment 300. As discussed above, the system 202 may include a usage monitoring service 220 which may determine the number of subscribers that may have registered with the network slice(s) 214. The steps of these methods thus described may pertain to different stages. It is also possible that certain steps of these methods may be performed while others may not be performed for implementing any particular stage. In any case, such examples would still fall within the scope of the claimed subject matter.

At block 502, a usage monitoring service may subscribe to the unified data repository for data change notifications. For example, the usage monitoring service 220 may subscribe to the UDR 210 for data change notifications. The subscriber data 212 stores different categories of data such as subscription data, authentication data, application data, and policy data. The data change notifications may be generated by the UDR 210 in the event of any changes to any of the different categories within the subscriber data 212.

At block 504, a data change notification is generated by the UDR in response to any change in the subscriber data. In an example, the UDR 210 may determine whether the subscriber data 212 has changed. The subscriber data 212 may change as additional subscribers interact and seek access of the network slice(s) 214. For example, the subscription data may include registration information of subscribers who may have subscribed to, registered with, or are otherwise associated with network slice(s) 214. When an additional subscriber, for example, registers with any one of the network slice(s) 214, the data modification in the form of their respective registration information is added to the UDR 210. In an example, the usage monitoring service 220, to generate the data change notification, may retrieve the data modification caused to the subscriber data 212. The data modification may thereafter be included within the data change notification. The data change notification thus generated, may be transmitted to the usage monitoring service 220.

At block 506, the data change modification from the unified data repository is received by the usage monitoring service. For example, the usage monitoring service 220 may receive the data change notification generated by the UDR 210. In an example, the data change notification received by the usage monitoring service 220 is stored as data change notification(s) 222.

At block 508, the received data change notification may be processed to obtain network slice data. For example, the usage monitoring service 220 may parse the data change notification(s) 222 to retrieve the data modification included therein. In an example, the data modification retrieved from the data change notification(s) 222 and is stored by the usage monitoring service 220 as the network slice data 224. As described previously, the network slice data 224 may include different categories of information pertaining to the subscriber registered with the network slice(s) 214 similar to the subscriber data 212. Examples of such information include, but are not limited, to subscriber identifiers, identifier of the network slice(s) 214, type of services to which the subscriber may be registered to, type of access, location information of the subscriber, time of registration, time of access, and such other information pertaining to the subscribers and the network slice(s) 214 to which the subscribers may be registered with. The network slice data 224 thus obtained may be stored within the system 202 or may be stored in a service repository 226 in communication with the system 202. In the manner as described above, the usage monitoring service 220 may continually obtain the data change notification(s) 222 from the UDR 210 and determine the network slice data 224, as and when any change to the subscriber data 212 occurs in the UDR 210.

At block 510, the network slice data may be analyzed to assess the usage of the network slices. For example, the usage monitoring service 220 may analyze the network slice data 224 to provide usage indication information 228. The usage indication information 228 may be used for assessing the usage of the network slice(s) 214 within the environment 200. In an example, the analysis of the network slice data 224 may be performed based on predefined rules, queries, automated programmed code, or combination thereof. The network slice data 224 once analysed provides the usage indication information 228. In an example, the usage indication information 228 may represent the manner in which the network slice(s) 214 are utilized. For example, the usage indication information 228 may depict active number of subscribers which may have been determined based on number of subscribers which may have registered with particular network slice(s) 214. In a similar manner, the network slice data 224 may be analyzed to determine the number of subscribers that may have registered during a given time interval, name, or type of services for which access was sought, location of subscribers requesting access to service, or type of access (i.e., 3GPP or non-3GPP technology-based access) used for accessing the network slice data 224.

At block 512, the usage indication information may be used for managing either operational attributes of the network slices or for performing certain service related functions. For example, the usage indication information 228 may be used for managing operational attributes of the network slice(s) 214 within the communication network. Operational attributes may refer to computational resources or similar infrastructure components that be deployed for the network slice(s) 214 or may refer to policies or rules that may have been deployed within the communication network. In case of the former, the usage indication information 228 may be used for assessing how the computational resources or components deployed for the network slice(s) 214, have to managed. In an example, the usage indication information 228 depicting an active number of subscribers registered with the network slice(s) 214 may be used for managing allocation of computational resources (e.g., processors, memory, etc.) for any one or more of the network slice(s) 214. Similar approaches may be adopted for other types of usage scenarios. For example, the usage indication information 228 may indicate that a set of network slices from amongst the network slice(s) 214 are utilized for IoT services (or any other service relying on low latency) but not for voice communication. In such a case, certain policies may be implemented which allow the network slice(s) 214 under consideration to be used for low latency services and not for communication services.

Figure 6:
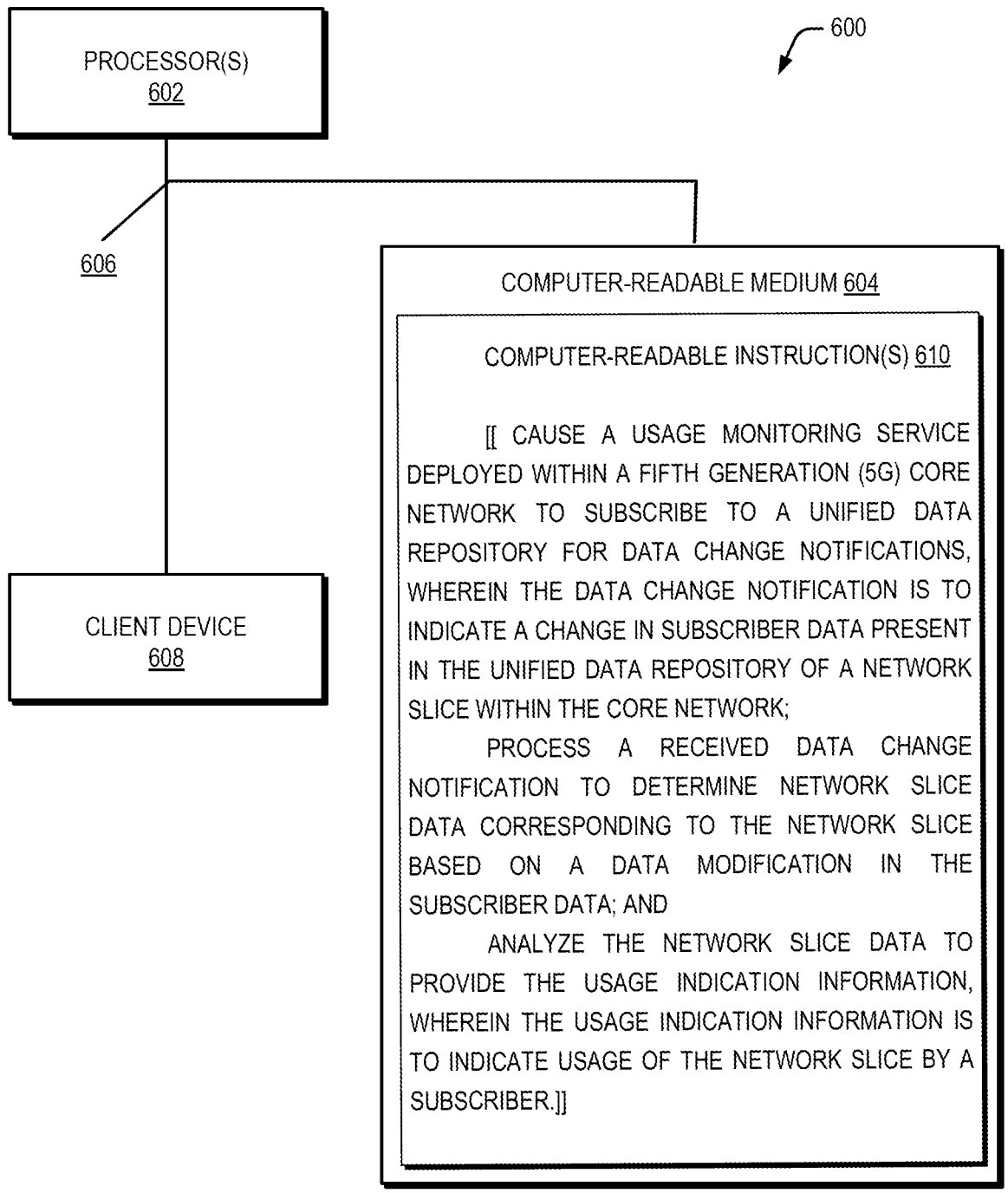
FIG. 6 illustrates a system environment implementing a non-transitory computer readable medium for analyzing usage of virtualized network instances within a communication network, as per an example.

FIG. 6 illustrates a computing environment 600 implementing a non-transitory computer readable medium for analyzing the usage of virtualized network instances (i.e., a network slice) within a communication network based on a data change notification. In an example implementation, the computing environment 600 may be the environment 200. In an example, the computing environment 600 includes processor(s) 602 communicatively coupled to a non-transitory computer readable medium 604 through a communication link 606. The processor(s) 602 may have one or more processing resources for fetching and executing computer-readable instructions from the non-transitory computer readable medium 604. The processor(s) 602 and the non-transitory computer readable medium 604 may be implemented, for example, in the environment 200.

The non-transitory computer-readable medium 604 may be, for example, an internal memory device or an external memory device. In an example, the communication link 606 may be a direct communication link, such as any memory read/write interface. In another example, the communication link 606 may be an indirect communication link, such as a network interface. The communication link 606 may be a single network or a combination of multiple networks and may use a variety of different communication protocols.

The processor(s) 602 and the non-transitory computer-readable medium 604 may also be communicatively coupled to a storage element 608. The storage element 608 enables the device bearing the processor(s) 602 and the non-transitory computer-readable medium 604 to determining number of subscribers that may be registered with a virtualized network instance (i.e., a network slice) based on a data change notification.

Referring to FIG. 6, in an example, the non-transitory computer readable medium 604 includes instruction(s) 610 that cause the processor(s) 602 to cause a usage monitoring service deployed within a fifth generation (5G) core network to subscribe to a unified data repository for data change notifications. The data change notifications are to indicate the change in the subscriber data which is stored and maintained in the unified data repository (i.e., the UDR). For example, the instruction(s) 610 may be executed to cause the usage monitoring service 220 to subscribe to data change notifications from the UDR 210. As discussed previously, the data change notifications may be generated by the UDR 210 whenever the subscriber data 212 pertaining to the network slice(s) 214, changes. Such changes may occur as a result of subscribers accessing, or otherwise interacting, with the network slice(s) 214 within the computing environment 200.

The instruction(s) 610 may be further executed to process data change notifications to determine a data modification that may have been made to the subscriber data within the UDR. For example, the instruction(s) 610 when executed may result in the processing of data change notification(s) 222 stored within the system 202. To this end, the instruction(s) 610 may cause the usage monitoring service 220 to parse the data change notification(s) 222 to obtain the data modification to the subscriber data 212. The data modification thus obtained may be stored as network slice data 224. The network slice data 224 may be similar to the subscriber data 212 and may include different categories of information pertaining to a given subscriber registered with the network slice(s) 214. Examples of such categories of information include, but are not limited to, subscriber identifiers, identifier of the network slice(s) 214, type of services to which the subscriber may be registered to, type of access, location information of the subscriber, time of registration, time of access, and such other information pertaining to the subscribers and the network slice(s) 214 to which the subscribers may be registered with.

Thereafter, the instruction(s) 610 may be executed to analyze the network slice data to provide the usage indication information. The usage indication information thus obtained is to indicate usage of the network slice by a subscriber. In an example, the instruction(s) 610 may cause the usage monitoring service 220 to analyze the network slice data 224 to provide the usage indication information 228. The usage indication information 228 obtained as a result of the analysis of the network slice data 224 may provide an indication of the usage of network slice(s) 214 within a communication network. The usage of the network slice(s) 214 may be depicted from a variety of perspectives. For example, the usage indication information 228 may depict the number of subscribers which may be registered with the network slice(s) 214. In such a case, the usage indication information 228 may directly represent the active customers which may be registered with the network slice(s) 214. In another example, the usage indication information 228 may depict a distribution of active subscribers across different time intervals for any one of the network slice(s) 214, time of access, location of access, types of services being accessed, etc. The usage indication information 228 once obtained may be used for managing operational attributes of the network slice(s) 214. In another example, the usage indication information 228 may be used for performing certain service-related operations, such as billing or for metering usage of the network slice(s) 214.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

The invention claimed is:

1. A system comprising:
 a processor; and
 a machine-readable storage medium comprising instructions executable by the processor to cause a usage monitoring service to:
  subscribe to a unified data repository for data change notifications, wherein the unified data repository is to generate a data change notification in response to a change in subscriber data stored within the unified data repository, and wherein the subscriber data corresponds to a virtualized network instance;
  receive a generated data change notification from the unified data repository in response to a data modification in the subscriber data, wherein the generated data change notification comprises the data modification, and
  wherein the data modification indicates at least one of an active number of subscribers for a given network slice, a frequency of access, a duration of access, a time of access, a location of access, and a type of access; and
  process the data modification retrieved from the generated data change notification to obtain usage indication information for the virtualized network instance.

2. The system as claimed in claim 1, wherein the subscriber data comprises subscription data, authentication data, application data, policy data, or combination thereof, corresponding to the virtualized network instance.

3. The system as claimed in claim 1, wherein to receive the generated data change notification, the instructions are executable by the processor to further:
 parse the generated data change notification received from the unified data repository to obtain the data modification; and
 store the data modification obtained from the generated data change notification as network slice data in a service repository.

4. The system as claimed in claim 1, wherein the usage monitoring service is to process the data modification retrieved from the generated data change notification based on a predefined rule to obtain the usage indication information.

5. The system as claimed in claim 1, wherein the usage indication information is to be utilized for performing network planning, wherein network planning comprises one of:
 scaling up a computational resource allocated for the virtualized network instance; or
 scaling down the computational resource allocated for the virtualized network instance.

6. The system as claimed in claim 1, wherein the usage indication information is utilized for ascertaining whether additional computational resource are to be allocated for the virtualized network instance.

7. The system as claimed in claim 1, wherein the virtualized network instance is a network slice within a fifth generation (5G) core network.

8. The system as claimed in claim 1, wherein the system is to communicate with the unified data repository over an interface based on Nudr_DataRepository service.

9. A method comprising:
 receiving a data change notification from a unified data repository, wherein the received data change notification is generated by the unified data repository in response to a data modification in subscriber data stored within the unified data repository corresponding to a network slice, and
 wherein the data modification indicates at least one of an active number of subscribers for a given network slice, a frequency of access, a duration of access, a time of access, a location of access, and a type of access;
 storing the data modification obtained from the received data change notification as network slice data, wherein the data modification is included within the received data change notification; and
 processing the network slice data to obtain usage indication information for the network slice.

10. The method as claimed in claim 9, wherein the receiving comprises:
 subscribing, by a usage monitoring service, to the unified data repository to receive a plurality of data change notifications from the unified data repository; and
 receiving, by the usage monitoring service subscribed to the unified data repository, the received data change notification.

11. The method as claimed in claim 9, wherein the data modification in the subscriber data occurs as a result of a subscriber registering with the network slice.

12. The method as claimed in claim 9, wherein the storing the data modification comprises:
 parsing the received data change notification to obtain the data modification; and
 storing the data modification in a service repository as the network slice data.

13. The method as claimed in claim 9, wherein the processing of the network slice data to obtain usage indication information is based on predefined rules, predefined queries, or combination thereof.

14. The method as claimed in claim 9, wherein the method further comprises utilizing the usage indication information for one of:
    managing an operational attribute of the network slice; and
    performing a service-related function pertaining to the network slice.

15. The method as claimed in claim 14, wherein the service-related function pertaining to the network slice comprises billing for usage of the network slice, metering for usage of the network slice, or combination thereof.

16. A non-transitory computer-readable medium comprising computer-readable instructions being executable by a processing resource to:
    cause a usage monitoring service deployed within a fifth generation (5G) core network to subscribe to a unified data repository for data change notifications, wherein the data change notifications are to indicate a change in subscriber data present in the unified data repository of a network slice within the core network;
    process a received data change notification to determine network slice data corresponding to the network slice based on a data modification in the subscriber data, wherein the data modification indicates at least one of an active number of subscribers for a given network slice, a frequency of access, a duration of access, a time of access, a location of access, and a type of access; and
    analyze the network slice data to provide the usage indication information, wherein the usage indication information is to indicate usage of the network slice by a subscriber.

17. The non-transitory computer-readable medium as claimed in claim 16, wherein the type of access is one of 3GPP technology-based access and non-3GPP technology-based access.

18. The non-transitory computer-readable medium as claimed in claim 16, wherein the usage monitoring service is to subscribe to the unified data repository for data change notifications instance over a nudr-dr interface.

19. The non-transitory computer-readable medium as claimed in claim 16, wherein the subscriber data corresponding to the network slice comprises subscription data, authentication data, application data, policy data, or combination thereof.

* * * * *